United States Patent Office 3,165,943
Patented Jan. 19, 1965

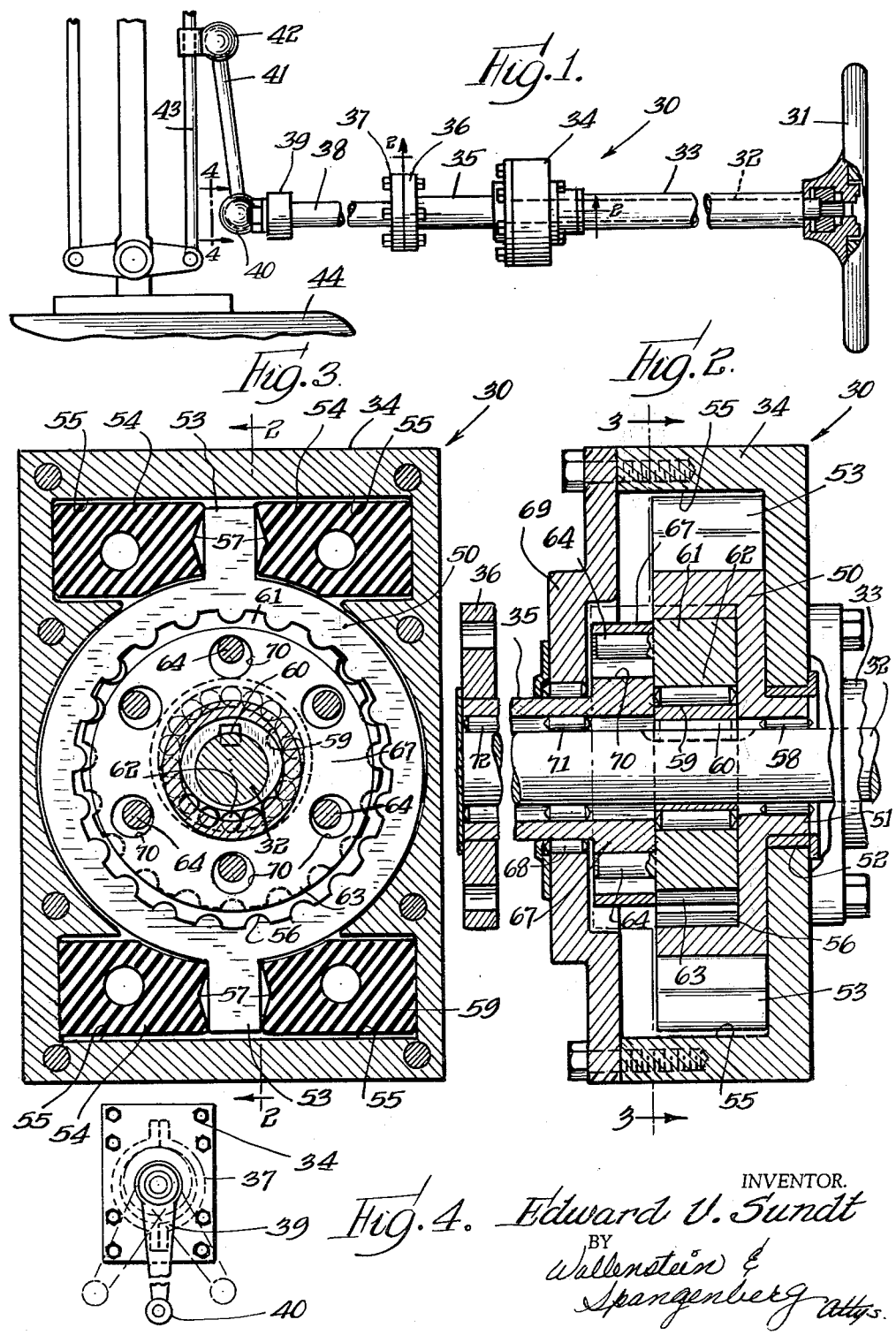

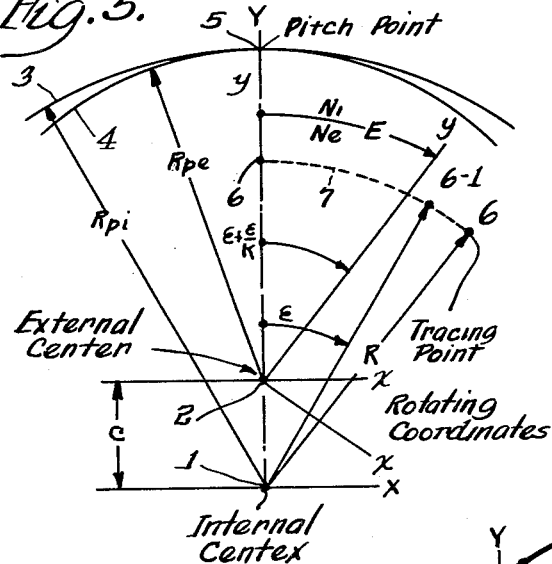
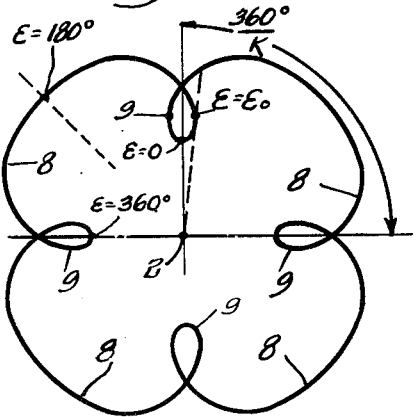
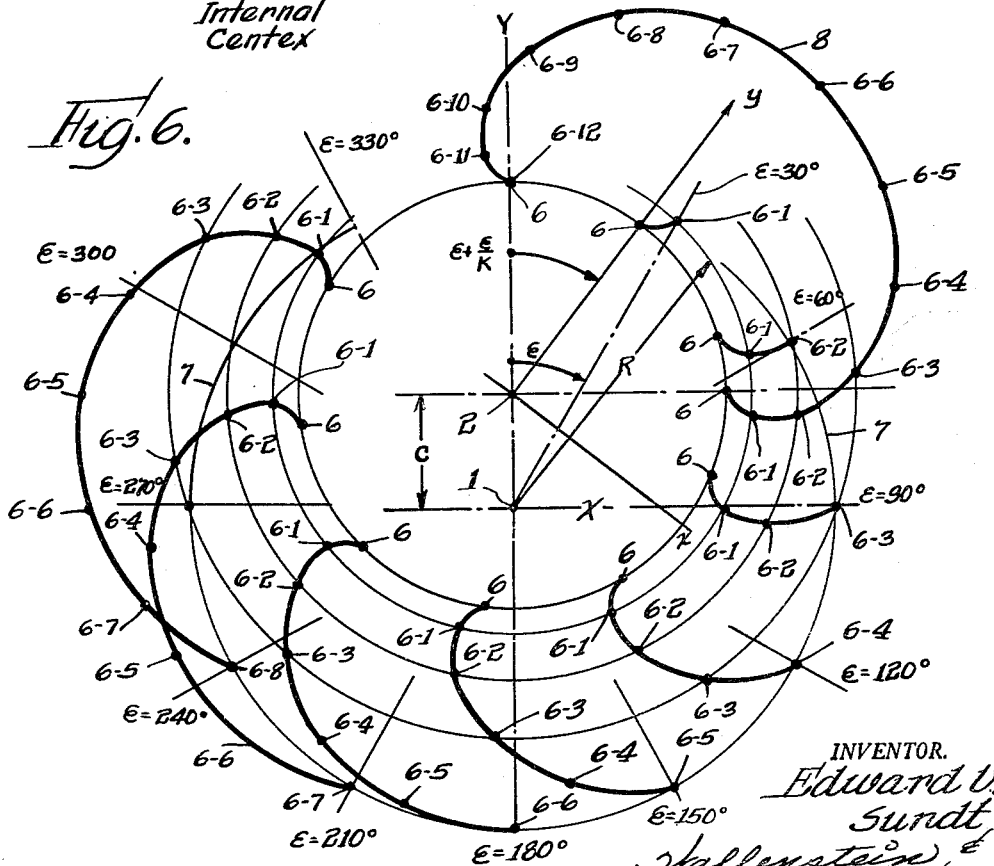

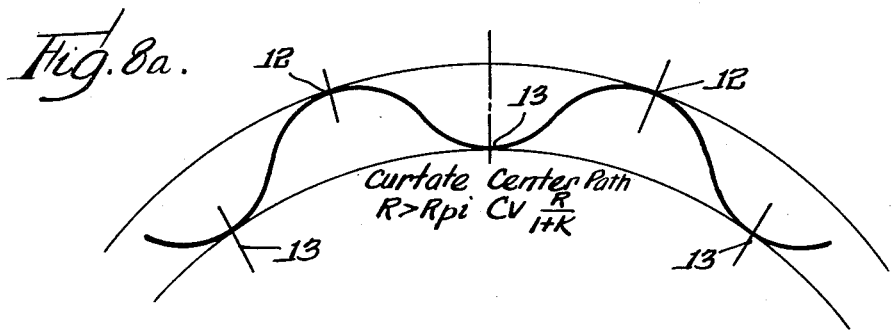
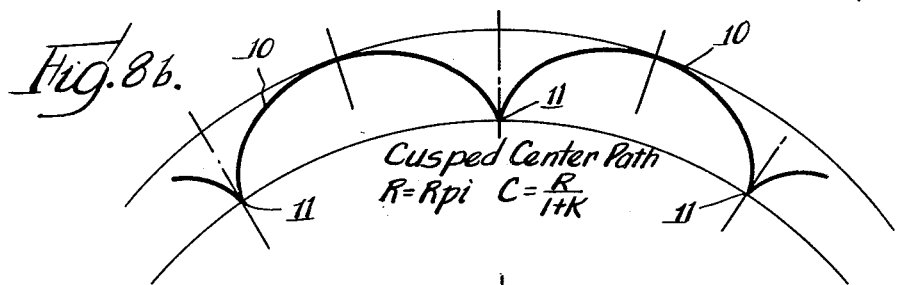
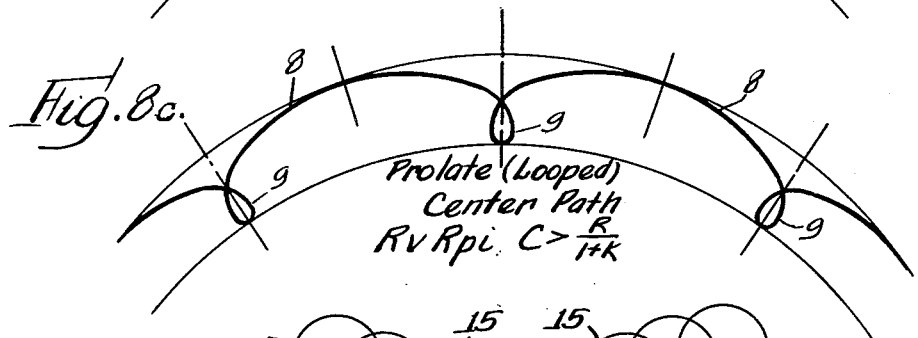
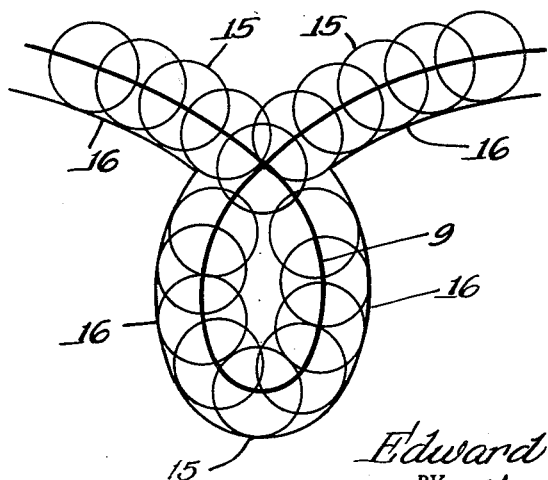

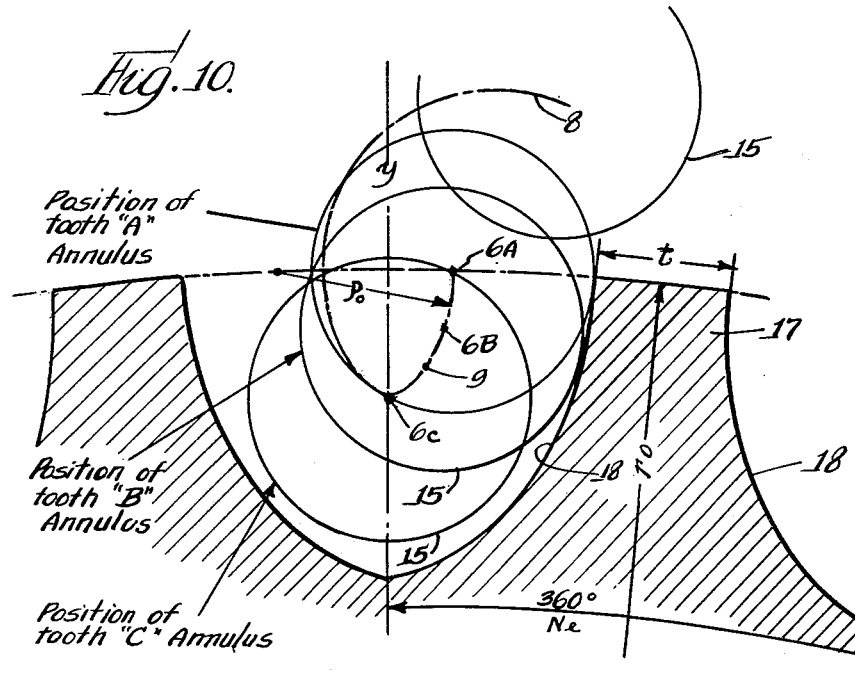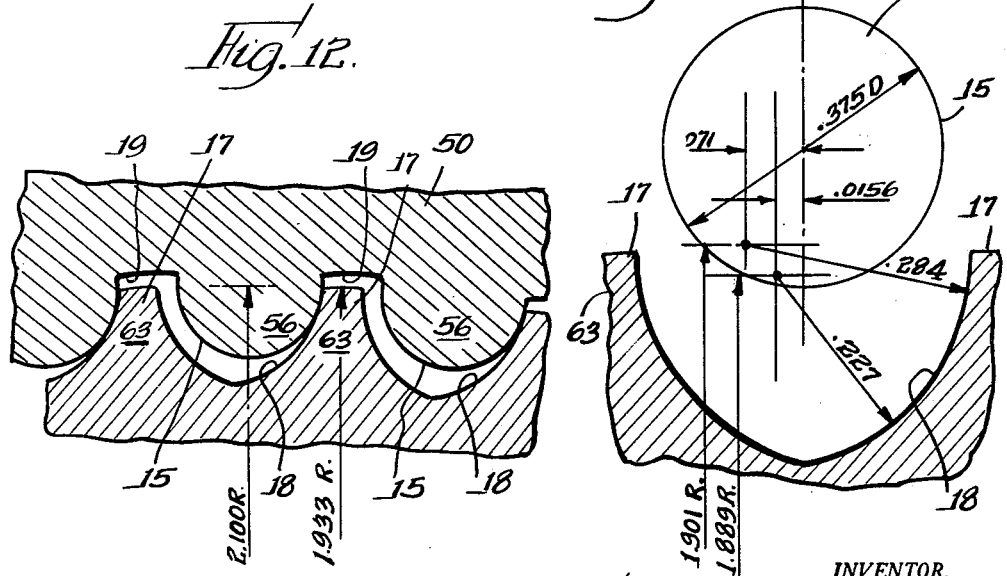

1

3,165,943
STEERING GEAR MECHANISM
Edward V. Sundt, 118 Sterling Lane, Wilmette, Ill.
Filed Dec. 23, 1959, Ser. No. 861,486
6 Claims. (Cl. 74—498)

The principal object of this invention is to provide a steering gear mechanism for vehicles, such as automobiles, trucks, tractors, ships and the like, which is simple and rugged in construction and reliable in operation and which is more efficient in operation and less expensive to manufacture than those currently in use.

Steering gear mechanisms usually employ some form of gear reduction, such as worms, ball bearing screws and the like and usually in the ratio of about 20 to 1 reduction in an automotive vehicle between the steering wheel and the wheels of the vehicle. It is extremely important that the reduction mechanism be as efficient as possible since this determines the force required by the driver to steer and park the vehicle. For many years, worm gears have been standard for this purpose, they having an efficiency running from 30% to 65% depending upon design and quality. In the steering gear mechanism of this invention, efficiencies between 90% and 95% are easily obtained.

Briefly, the steering gear mechanism of this invention, for the steering means of vehicles or the like, includes a manipulatable rotatable control shaft and a rotatable driven shaft operating the steering means pursuant to manipulations of the control shaft. A stationary internal toothed annulus is arranged concentrically with the axis of the control shaft and an eccentric is carried by the control shaft. An external toothed rotor meshing with the internal toothed annulus is rotatably mounted on the eccentric for oscillation with respect to the annulus and for rotation at a reduced speed with respect to the control shaft in accordance with the relative members of teeth on the annulus and rotor, a speed reduction ratio of 20 to 1 being here disclosed for purposes of illustration. An output member, connected to the driven shaft for rotating the same, is rotatably mounted concentrically with the axis of the control shaft and is coupled to the rotor for rotation thereby.

The major parts of this steering gear mechanism may be made by powder metallurgy processes, thus providing inexpensive manufacture and accurate operation since radial tolerances are held very well in such processes. The teeth of the rotor are based on a looped prolate center path generated by a tracing point on the tooth centers of the annulus with respect to the rotor upon rotation of the annulus and rotor in accordance with the speed reduction ratio. Such a tooth form is very strong, some four times stronger than spur gears of similar diametral pitch and twice as strong as worm gear teeth, and there is also good conjugation with at least two tooth engagement. In addition to being strong, the tooth form also has a low pressure angle with respect to the teeth of the annulus so that minimum radial load is reflected back against the eccentric, and it has a nominal efficiency value of about 97%. Minimum frictional losses are also sustained, particularly on the input side, by the use of antifriction bearings.

A great deal of cost in the production of steering gear mechanisms is by reason of the fact that they must sustain road shocks in the range of about 5,000 inch pounds in passenger cars and up to about 20,000 inch pounds in tractors. One reason these values are so high is that the steering systems are usually very rigid affairs in which the shock loads are decelerated through a very short distance. In the steering gear mechanism of this invention these shock loads are decelerated more gradually by resilient means which normally secure the annulus against rotation but which resiliently permit limited rotation thereof, the resilient means forming a strain release and absorbing shocks transmitted from the steering means through the driven operating shaft. Preferably, the resilient means for the annulus comprise rubber like pads or bumpers.

The manner of deriving and generating the looped prolate tooth form is also disclosed and claimed in my co-pending application Serial No. 786,731, filed January 14, 1959, now U.S. Patent No. 3,037,400, and this application is a continuation-in-part of said co-pending application.

Further objects of this invention reside in the details of construction of the steering gear mechanism and in the cooperative relationships between the component parts thereof.

Other objects and advantages of this invention will become apparent to those skilled in the art upon reference to the accompanying specification, claims and drawings in which:

FIG. 1 is a plan view of the steering gear mechanism of this invention;

FIG. 2 is a vertical sectional view of a portion of the steering gear mechanism taken substantially along the lines 2—2 of FIGS. 1 and 3;

FIG. 3 is a vertical sectional view taken substantially along the line 3—3 of FIG. 2;

FIG. 4 is an end view taken substantially along the line 4—4 of FIG. 1;

FIG. 5 is a graphical representation of the parameters involved in generating a looped prolate center path curve which forms the base for the teeth of the annulus and rotor;

FIG. 6 is a graphical representation similar to FIG. 5 but illustrating the steps taken in the generation of the looped prolate center path curve;

FIG. 7 is a graphical representation illustrating the completely generated looped prolate center path curve;

FIGS. 8a, 8b and 8c are curves illustrating three epitrochoids, curtate, cusped and looped prolate, respectively, the latter being the epitrochoid utilized in this invention;

FIG. 9 is a portion of the looped prolate center path showing the teeth of the annulus following that center path, and showing the envelope curve of such teeth;

FIG. 10 is an enlarged illustration illustrating the coaction between the teeth of the annulus and rotor constructed in accordance with the instant invention;

FIG. 11 is a partial view illustrating and giving the dimensions for a typical arrangement for producing a speed reduction ratio of 20 to 1; and FIG. 12 is a partial view showing the coaction of the teeth of the arrangement illustrated in FIG. 11.

Referring first to FIGS. 1–4, the steering gear mechanism of this invention is generally designated at 30. It includes a conventional steering wheel 31 for manipulating a conventional rotatable control shaft 32 which is rotatably mounted in a conventional jacket tube 33. The jacket tube 33 is suitably connected to a housing 34 through which the rotatable control shaft 32 extends, the housing 34 containing a differential gear reducer. The differential gear reducer within the housing rotates a sleeve extension 35 at a reduced speed, the sleeve extension 35 extending from the other side of the housing. A coupling member 36 is carried by the outer end of the sleeve 34 and is suitably connected to a coupling member 37 carried by one end of a rotatable driven shaft 38. The other end of the shaft 38 carries an arm 39 which is connected by a ball joint 40 to a link 41 which in turn is connected by a ball joint 42 to a linkage 43 for steering or turning the wheels 44 of a vehicle, such as an automobile, truck, tractor, or the like. Preferably, the differential gear reducer in the housing 34 has a speed reduction ratio of 20 to 1 so that, as the steering wheel 31 is manipulated, the sleeve extension 35 is rotated at the 20 to 1 speed reduction ratio for the purpose of turning or steering the wheels 44.

Arranged within the housing 34 concentrically with the control shaft 32 is an internal toothed annulus 50 having a cylindrical extension 51 by which it is rotatably journaled in the housing 34 through a bearing 52. The internal toothed annulus 50 is provided with a pair of oppositely and radially arranged projections 53 and two pairs of resilient means in the form of rubber like bumpers or pads 54 are arranged on opposite sides of the projections 53. These bumpers or pads 54 are carried in recesses 55 formed in the housing 34 and are suitably secured in place therein. The interior of the housing 34, in addition to having a configuration for receiving the resilient pads or bumpers, also has a configuration for accommodating the internal toothed annulus 50, as shown more clearly in FIG. 3. The rubber like pads or bumpers 54 engage the projections 53 of the internal toothed annulus 50 and operate normally to secure the annulus against rotation but resiliently to permit limited rotation thereof. The rubber like pads or bumpers 54 operate as aperiodic type members to form a strain release and to absorb road shocks that may be transmitted from the steering means to the internal toothed annulus 50. Preferably, the portions of the pads or bumpers 54 engaging the radial projections 53 of the internal toothed annulus 50 are notched as indicated at 57 so as to provide increased progressive resistance to rotation of the internal toothed annulus 50. In other words, the pads or bumpers 54 act as shock absorbers which are responsive to light shock loads at the start of their movement but which gradually increase the resistance to motion as such motion continues.

The internal toothed annulus 50 is also provided with internal teeth 56 and they are shown for purposes herein as being substantially semicircular in configuration. The internal toothed annulus 50 is preferably formed of powdered iron or the like so that it may be inexpensively yet accurately manufactured by conventional powder metallurgy processes, the teeth 56 being accurately molded therein.

The manipulatable rotatable control shaft 32 is journalled for rotation in the housing 34 concentrically with the internal toothed annulus 50 by antifriction roller bearings 58 arranged between the shaft 32 and the cylindrical extension 51 of the internal toothed annulus 50. An eccentric 59 is carried by the shaft 32 and is keyed thereto for rotation therewith by a key 60. An external toothed rotor 61 is rotatably mounted on the eccentric 59 by antifriction rollers 62. The rotor 61 is provided with external teeth 63 which mesh with the internal teeth 56 of the annulus 50. The eccentric 59 may be formed of any suitable material, such as steel and, preferably, the external toothed rotor 61 is formed of powdered iron or the like by the usual powdered metallurgy processes. The teeth 63 in cooperation with the teeth 56 are derived and generated in the manner to be pointed out more fully hereafter so as to provide maximum strength and maximum efficiency. In order to provide the desired speed reduction ratio of 20 to 1, the internal toothed annulus has 21 internal teeth while the rotor has 20 external teeth. As the eccentric 59 is rotated by the manipulatable control shaft 32, the rotor 61 is oscillated with respect to the annulus 50 and is rotated at a reduced speed with respect to the control shaft 32 and, by reason of the relative numbers of teeth on the annulus and rotor, the speed reduction ratio is 20 to 1. In other words, it would require 20 rotations of the eccentric 59 to cause 1 complete rotation of the rotor 61.

The rotor 61 is provided with a plurality of circumferentially arranged pins 64, six in number being shown for purposes of illustration, and these pins are preferably formed on the rotor during the formation of the rotor. Concentrically arranged with respect to the control shaft 32 is an output member 67 which is carried by the sleeve extension 35. The output member 67 and the sleeve extension 35 are journalled for rotation in the housing 34 by means of antifriction rollers 68 carried in a cover 69 suitably secured to the housing 34. The output member 67 is provided with a plurality of enlarged openings 70 which receive the pins 64 of the rotor 61 and the pins 64 and openings 70 operate as a coupling means for coupling the rotor 61 to the output member 67 for rotating the latter as the former is rotated. Also to rotatably mount the control shaft 32 and the output member 67 and its sleeve extension 35, there are preferably arranged between the control shaft 32 and the sleeve extension 35 an inboard antifriction roller bearing 71 and an outboard antifriction roller bearing 72, the shaft 32 extending substantially throughout the length of the sleeve extension 35. This provides an extremely rugged construction which is extremely efficient in operation. The use of the antifriction bearings as herein recited, along with the use of the tooth form to be hereinafter described, provides an extremely efficient steering gear mechanism, having an efficiency up to between 90% and 95%.

Briefly, in operation, when the steering wheel 31 is manipulated to rotate the control shaft 32, the eccentric 59 is rotated to oscillate or gyrate the external toothed rotor 61, and since the external toothed rotor 61 meshes with the normally stationary internal toothed annulus 50, the internal toothed rotor 61 is caused to rotate at a reduced speed with respect to the control shaft 32, for example at a speed reduction ratio of 20 to 1 as described above. This rotation of the external toothed rotor 61 is transmitted through the pins 64 and enlarged openings 70 to correspondingly rotate the output member 67 and the operating shaft 35 for operating the steering mechanism for the wheels 44. The rubber like bumpers or pads 54, which operate normally to secure the internal toothed annulus 50 stationary, operate to resiliently permit limited rotation of the internal toothed annulus to absorb road shocks transmitted from the steering mechanism through the operating shaft 35.

In the construction of the cooperating teeth of the rotor and the annulus to provide high efficiency and proper conjugation, various interdependent factors must be taken into consideration. These factors are different for different speed reduction ratios (hereinafter called K), power capacity, size of teeth, diameters of rotor and annulus, and amount of eccentric motion (hereafter called C). These affect tooth form and also dynamic balance characteristics and, in this regard, if the internal tooth form of the annulus is determined, it mathematically fixes the form the rotor external tooth must take in order to insure uniform angular movement. In the description that follows, a perfectly circular tooth form in the annulus is used since experiment has proven that it is possible to obtain extremely high efficiencies with this tooth form. Hereafter, the radius from the central axis 1 to the center of these circular teeth of the annulus will be represented by the character R. There are thus established the basic factors K, C and R and, in accordance with this invention, they are combined in their optimum values with the most effective tooth form to produce a differential gear reducer of maximum efficiency.

In the description that follows, three mathematical curves will be considered, these curves being from the general family of curves known as epitrochoids. These curves are traced by the tooth centers of the annulus upon the rotor when the two are rotated in a timed relation, in accordance with the speed reduction ratio K, and about the eccentric axes 1 and 2, which are arranged apart at a distance C. For the sake of simplicity, these curves are termed center paths, and the tooth center of the annulus is termed the trace point. The three curves are illustrated in FIGS. 8a, 8b and 8c, and they result from varying values of C and R. The curtate center path curve of FIG. 8a results when R is greater than the radius to the pitch point of the internal toothed annulus and when C is less than $$\frac{R}{1+K}$$

The cusped center path curve of FIG. 8b results when R is equal to the radius to the pitch point of the internal toothed annulus and when C is equal to $$\frac{R}{1+K}$$

The looped prolate center path curve of FIG. 8c results when R is less than the radius to the pitch point of the internal toothed annulus and when C is greater than $$\frac{R}{1+K}$$

The curtate form of FIG. 8a is generally known in the art and no detailed consideration thereof is given here, except to say that it is suited only to large values of C and low values of K and is extremely inefficient in operation because of large pressure angles existing at the points of contact of the teeth. The cusped form of FIG. 8b will be considered for comparison purposes only, since teeth generated from this form are structurally unsound, do not have small pressure angles, do not yield uniform angular motion, and are noisy in operation. In accordance with the instant invention, the looped prolate form of FIG. 8c is used, and it is admirably suited to small values of C and high K ratios. Its use is also most appropriate when it is desired for manufacturing reasons to have C as large as possible.

Regardless of how the gears are to be used in a speed reducing (or increasing) system, whether they roll on fixed centers or whether one of them is carried around by an eccentric, their relative motion is still that of the system shown in FIG. 5. Here, two systems of coordinates are used. The X–Y coordinates are stationary, the origin being at the center 1 of the internal toothed annulus. The x–y coordinates have their origin at the center of the external toothed rotor, the fixed point corresponding to $X=0$, $Y=C$ and they are attached to rotate with the external toothed rotor. The tracing point 6, which is the center of the circular internal tooth of the annulus, is at a distance R from the center of the internal toothed annulus and is, of course, fixed to the annulus. As the annulus rotates, the tracing point 6 follows the circle 7 which is concentric with the axis 1. When the annulus rotates about its axis 1 through an arbitrary angle $\epsilon$, the rotor must turn about its axis through an angle $$\frac{N_i}{N_e}\epsilon$$

where $N_i$ is the number of internal teeth in the annulus and $N_e$ is the number of external teeth in the rotor, because the fundamental requirement of the gearing of this invention is that they have a constant angular velocity ratio determined by the ratio of the numbers of teeth. The relative motion is the same as that of two non-slipping circles 3 and 4 rolling on the centers 1 and 2 and having pitch radii proportional to the numbers of teeth in the annulus and rotor. The pitch radius for the circle 3 of the internal toothed annulus is designated $R_{pi}$ and the pitch radius for the circle 4 of the external toothed rotor is designated $R_{pe}$. The ratios of the pitch radii and the numbers of teeth are $$\frac{R_{pi}}{R_{pe}}=\frac{N_i}{N_e}$$

The pitch circles 3 and 4 contact one another at the pitch point 5 on the Y axis of the X–Y coordinates. Generally, if C, $N_i$, and $N_e$ are assumed, the pitch radii are determined from the following formulas:

$$R_{pe}=\frac{CN_e}{N_i-N_e}$$

$$R_{pi}=\frac{CN_i}{N_i-N_e}$$

In particular, if the gearing is to be of the single stage reducer type, where the rotor is eccentrically driven and the output is picked off in a one-to-one ratio by some means from the rotor, such as in FIGS. 2 and 3, the system has a speed reduction ratio K given by the aforementioned formula $$K=\frac{N_e}{N_i-N_e}$$

Thus, it is convenient to express the pitch radii in terms of K and C, $R_{pe}=CK$ and $R_{pi}=C(K+1)$.

Referring again to FIG. 5, it is assumed that the tracing point 6 is initially at the Y-axis corresponding to $\epsilon=0$. Obviously, this defines the point at which the generated curve comes closest to the rotor center. If now the tracing point is moved along the circle 7 through an arbitrary angle $\epsilon$ and the x–y coordinate system is simultaneously moved through the angle $$\frac{N_i}{N_e}\epsilon$$

a new point 6–1 is defined in the x–y system. The coordinates of this point are given by the following parametric equations:

$$x=-R\sin\left(\frac{\epsilon}{K}\right)+C\sin\left(\epsilon+\frac{\epsilon}{K}\right)$$

$$y=-R\cos\left(\frac{\epsilon}{K}\right)-C\cos\left(\epsilon+\frac{\epsilon}{K}\right)$$

(1)

If R is given and C is assumed, these equations give a value of x and y corresponding to every choice of a value for the arbitrary variable parameter $\epsilon$. If the parameter is varied in increments, the corresponding values of x and y can be plotted to any convenient scale, determining a series of points 6 which all lie on the center path sought. One full cycle of the path is determined if $\epsilon$ varies from 0° to 360°.

Different paths result from choosing different values for the center distance C, these curves being classified as curtate in FIG. 8a when C is less than $$\frac{R}{1+K}$$

as cusped in FIG. 8b when C is equal to $$\frac{R}{K+1}$$

and looped prolate in FIG. 8c when C is greater than $$\frac{R}{K+1}$$

Since, in any design, R and K are predetermined and must be held fixed, and since for the generally large reduction ratios desired it is preferable to use as large a center distance C as possible, the looped prolate center path is the most desirable. FIGS. 5 and 6 show graphically how such a looped prolate path is generated and in these figures the values used for purposes of illustration are $R=3$, $K=4$, and $C=1$. In FIG. 5 the particular position for which the rotating x–y coordinate system is shown corresponds to the value of the parameter $\epsilon=40°$. Checking this by means of the aforementioned parametric Equations 1, we have $$\epsilon=40°\quad \frac{\epsilon}{K}=10°\quad \epsilon+\frac{\epsilon}{K}=50°$$

The equations give $$x = -.52095 + .76604 = .245$$
$$y = 2.95443 - .64279 = 2.312$$

FIG. 6 illustrates the manner of generating the looped prolate center path, the generation being accomplished, for purposes of illustration, at $\epsilon$ angles of 30° from 0° to 360°, the respective center path points so generated being designated from 6 to 6–12 along the circle 7 having the radius R. A complete prolate path for 360° rotation of the tracing point 6 is shown at 8 in the upper right hand portion of FIG. 6. The ends of the prolate path 8 form loops 9. A complete prolate path with respect to the external toothed rotor is one revolution thereof, as shown in FIG. 7, there being four such prolate paths 8 since the speed reduction ratio K was assumed to be 4. Each prolate path 8 with its loops 9 extends through $$\frac{360°}{K}$$

there being thus K number of looped prolate paths in a complete cycle of rotation of the external toothed rotor. The beginning of each path is at $\epsilon=0$, and the end of each path is at $\epsilon=360°$ while the midpoint of the path is at $\epsilon=180°$. One point of particular importance on the looped prolate curve is the point at which the curve is tangent to a radial line. This is the point designated in FIG. 7 as $\epsilon=\epsilon_0$ where the curve has a zero pressure angle, and this point must be on the active part of the center path of the tooth profile in order to provide maximum efficiency. The curtate center path curve 12 of FIG. 8a has an undulating $\epsilon=0$ point 13 and there can be no point thereon corresponding to the point $\epsilon=\epsilon_0$ as in FIG. 7. There, therefore, cannot be any zero pressure point in the curtate center path system. The cusped center path curve 10 of FIG. 8b has a sharp point 11 corresponding to the point $\epsilon=0$ in FIG. 7 and it is only at this point where $\epsilon$ can equal $\epsilon_0$. Here, however, this point of zero pressure angle, since it occurs at point 11 in FIG. 8b, cannot be present on an active face of the gear teeth. Accordingly, only in the looped prolate center path system can a zero pressure angle be obtained on an active face of the gearing.

After computing the looped prolate center path, as described above, the actual tooth curves can be determined by layout, by scribing a series of circles 15 equal to the diameters of the internal teeth of the annulus with centers of the circles at various points along the center path, and drawing a curve 16 which is the envelope of these circles, as illustrated in FIG. 9. The portion of the envelope curve 16 in the loop 9 of the looped prolate curve 8 is the critical portion of the gear system, it forming the contact area and including the minimum pressure angles. This envelope curve 16 in this area forms the basis for the construction of the external teeth on the rotor, and the relationships there involved are illustrated in greater detail in FIG. 10.

In the design of gear teeth of this type, a number of general considerations must be kept in mind. The teeth must have sufficient carry-over of conjugate contact between adjacent teeth, so that there are no gaps or shocks in the uniform transmittal of motion. In the case of the gearing under consideration, this means that somewhere on the tooth profiles a smooth section must exist over which the parameter $\epsilon$ varies through an angle greater than $$\frac{360°}{N_1}$$

Also, the pressure angles at the active points of contact of the gear teeth should be as small as possible to minimize tooth and bearing loads. In addition, at no point should the external tooth form of the rotor interfere with the internal tooth of the annulus. It is better if clearance exists between the tooth forms at every point except where there is advantageous transmittal of motion. Further, the teeth of the rotor should have sufficient structural strength to carry the loads required. Also, the design should be such that dimensional variations due to manufacturing tolerances and wear have a minimum effect on the smoothness of action. Further, for ease of manufacturing, it should be possible to closely approximate the external tooth form of the rotor with an arc of a circle.

To aid in determining the best tooth forms in accordance with these criteria, formulas have been derived and are set forth hereafter for various features of the center paths. These formulas are all related to the parametric Equations 1 set forth above. Every point 6 of the center path corresponds to a particular value of the parameter $\epsilon$, and vice versa. Thus, the meaning of an $\epsilon$ point of the center path should be clear, that is, for example, a 30° point is the one given by the setting $\epsilon=30°$ and solving for $x$ and $y$. It is simplest to describe certain features of the center paths, such as radius of curvature, pressure angles and so forth, by formulas in terms of the parameter $\epsilon$.

Typical $\epsilon$ points of a looped prolate center path are shown in FIGS. 6 and 7. As expressed above, one point of particular importance is the point $\epsilon=\epsilon_0$ in FIG. 7 at which the curve is tangent to a radial line. This is the point where the curve has zero pressure angle and, according to the above discussed general considerations, this point must be on the active part of the center path of the tooth profile. A formula will be given hereafter for the value of the parameter $\epsilon$ which corresponds to this point, and it has been given the special symbol $\epsilon_0$.

As an aid in computation, and for the purpose of observing basic similarities in many different designs, it is best to write the equations as much as possible in a dimensionless form. Toward this end, a center distance magnification factor $m$ is defined as follows:

$$m = \frac{C(K+1)}{R}$$

or, equivalently, $$C = m\left(\frac{R}{K+1}\right) \quad (2)$$

The magnification factor is a dimensionless quantity which enables the classification of the various center paths as undulating curtate in FIG. 8a when $m$ is less than 1, cusped in FIG. 8b when $m$ is equal to 1, and looped prolate in FIG. 8c when $m$ is greater than 1. With this in mind, the parametric Equations 1 above of the center path may be written in terms of the center distance magnification factor $m$ as follows:

$$x = R\left[-\sin\left(\frac{\epsilon}{K}\right) + \left(\frac{m}{1+K}\right)\sin\left(\epsilon + \frac{\epsilon}{K}\right)\right]$$
$$y = R\left[\cos\left(\frac{\epsilon}{K}\right) - \left(\frac{m}{K+1}\right)\cos\left(\epsilon + \frac{\epsilon}{K}\right)\right] \quad (3)$$

These equations are in every way equivalent to the parametric Equations 1 above. Let $r$ equal the radius to any $\epsilon$ point of the center path, then $$r = \sqrt{x^2+y^2} = R\sqrt{1+\left(\frac{m}{K+1}\right)^2 - 2\left(\frac{m}{K+1}\right)\cos\epsilon} \quad (4)$$

Let $\rho$ equal the radius of curvature of the center path, then $$\rho = R\left[\sqrt{\frac{1+m^2-2m\cos\epsilon}{1+\frac{Km(m-\cos\epsilon)}{1+m^2-2m\cos\epsilon}}}\right] \quad (5)$$

The particular value of $\epsilon$ for which the looped center path is tangent to a radial line is given by $$\cos\epsilon_0 = \frac{K+1+m^2}{m(K+2)} \quad (6)$$

Values of the various quantities determined for $\epsilon=\epsilon_0$ will carry the same subscript, that is, $x_0$, $y_0$, and so forth.

Formulas 2 through 6 are all in dimensionless form, except for the factor R. These formulas apply to all possible center paths, as shown in FIGS. 8a, 8b and 8c, but it should be noted that in Equation 6 $m$ must be greater than (or equal to) 1 and less than (or equal to) $K+1$, since the value of a cosine cannot be greater than 1. This means that the curtate center path cannot have a zero pressure angle point and that only the looped prolate and cusped center paths can have a zero pressure angle point. For the cusped path where $m=1$, the zero pressure angle is at $\epsilon=0$, and Equation 5 shows that at this point the radius of curvature of the cusped path is zero. Accordingly, in the vicinity of this point the curve is concave toward the center and has a very small radius of curvature as well as rapidly increasing pressure angle. Hence, the cusped curve is not a good center path for this type of gearing. As a result, to obtain proper tooth formation in accordance with this invention, $m$ must be greater than 1 and less than $K+1$, which requires the base curve for the teeth formation to be a looped prolate center path curve. By reason of the foregoing analysis, FIG. 10 illustrates how a tooth form is derived for the rotor for use in the differential gear reducer of this invention. This tooth form has been found to be highly efficient, quiet and vibrationless.

Referring further to FIG. 10, the circles 15 represent four internal teeth of the annulus 60, one of the teeth 15 being located at a distance from the rotor on the curve 8 so as to illustrate the manner in which clearance between the annulus and rotor is obtained, and the other three teeth being designated A, B and C, which are arranged in the critical contacting area. In FIG. 10 the internal annulus teeth A and B are in pressure contact with the external rotor tooth 17, while the internal annulus tooth 15 has left the rotor tooth 17. In other words, A represents the position of a tooth just entering engagement with the rotor, B represents the second tooth back, and C the third tooth back. By use of the looped prolate center path, it is thus evident that by choosing eccentric distance C as required, one, two or three teeth 15 may be in simultaneous engagement with the rotor 17. This choice is impossible with the cusped type center path and is severely limited, if not impossible, with the curtate type center path. By having two or more teeth in engagement, the power that can be transmitted through the reducer is greatly strengthened, and noise and vibration are substantially eliminated. The engaging surface 18 of the external rotor teeth 17 is circularly concave for ease of manufacturing, and the active portions thereof correspond to the loop portion 9 of the looped prolate center path 8 adjacent the zero pressure angle, the zero pressure angle being $\rho_0$ and being at a distance $r_0$ from the axis 2 of the rotor. To provide adequate and proper power transmission, the external teeth 17 of the rotor must be sufficiently thick, as shown by the dimension $t$, this dimension being a function of the numbers of teeth and the radii of the annulus and rotor. The spacing of the teeth in the rotor corresponds to $$\frac{360°}{N_e}$$

Having thus described the manner of forming the configuration of the external teeth of the rotor with respect to the internal teeth on the annulus following the use of the looped prolate center path base, the application of those principles to the formation of the teeth of the steering gear mechanism shown in FIGS. 2 and 3 is illustrated in FIGS. 11 and 12, the typical dimensions being set forth for the speed reduction ratio of 20 to 1 wherein the annulus has 21 internal teeth 15 and the rotor has 20 external teeth 17 and wherein the eccentricity value C is .143 inch. The radius from the axis 1 to the tracing point or center of the annulus teeth is 2.100 inches and the external radius of the rotor is 1.933 inches. The internal teeth 55 of the annulus 50 are circular in configuration, as shown by the circles 15, and the annulus 50 is cut back as indicated at 19, for providing clearance for the rotor teeth 17. The annulus teeth have a diameter of .375 inch. The concave faces 18 of the teeth 17 have two radii of curvature, these curvatures of the faces blending together and having radii and centers as shown in FIG. 11. The looped prolate tooth configurations illustrated in FIGS. 11 and 12, in the arrangement shown in FIGS. 2 and 3, have produced efficiencies of over 90%.

While for purposes of illustration one form of this invention has been disclosed, other forms thereof may become apparent to those skilled in the art upon reference to this disclosure and, therefore, this invention should be limited only by the scope of the appended claims.

I claim as my invention:

1. A steering gear mechanism for the steering means of vehicles or the like comprising, a manipulatable rotatable control shaft, a rotatable driven shaft operating the steering means pursuant to manipulations of the control shaft, a stationary internal toothed annulus concentric with the axis of the control shaft, an eccentric carried by the control shaft, an external toothed rotor meshing with the internal toothed annulus and rotatably mounted on the eccentric for oscillation with respect to the annulus and for rotation at a reduced speed with respect to the control shaft in accordance with the relative members of teeth on the rotor, the teeth of the annulus and rotor being based on a looped prolate center path generated by a tracing point on the tooth centers of the annulus with respect to the rotor upon rotation of the annulus and rotor in accordance with the speed reduction ratio, an output member rotatably mounted concentrically with the axis of the control shaft and connected to the driven shaft for rotating the same, and coupling means between the rotor and the output member for rotating the output member as the rotor is rotated.

2. A steering gear mechanism for the steering means of vehicles or the like comprising, a manipulatable rotatable control shaft, a rotatable driven shaft operating the steering means pursuant to manipulations of the control shaft, an internal toothed annulus member concentric with the axis of the control shaft, an eccentric carried by the control shaft, an external toothed rotor member meshing with the internal toothed annulus member and rotatably mounted on the eccentric for oscillation with respect to the annulus, means for securing one of said members against rotation, the other of said members being rotated at a reduced speed with respect to the control shaft in accordance with the relative numbers of teeth on the annulus member and the rotor member, the teeth of the rotor member being based on a looped prolate center path generated by a tracing point on the tooth centers of the annulus member with respect to the rotor member upon rotation of the annulus member and rotor member in accordance with the speed reduction ratio, an output member rotatably mounted concentrically with the axis of the control shaft and connected to the driven shaft for rotating the same, and coupling means between the output member and the rotatable one of the annulus and rotor members for rotating the former as the latter is rotated.

3. A steering gear mechanism for the steering means of vehicles or the like comprising, a manipulatable rotatable control shaft, a rotatable driven shaft operating the steering means pursuant to manipulations of the control shaft, an internal toothed annulus rotatably mounted concentric with the axis of the control shaft, resilient means normally securing the annulus against rotation but resiliently permitting limited rotation thereof, an eccentric carried by the control shaft, an external toothed rotor meshing with the internal toothed annulus and rotatably mounted on the eccentric for oscillation with respect to the annulus and for rotation at a reduced speed with respect to the control shaft in accordance with the relative numbers of teeth on the rotor, the teeth of the annulus and rotor being based on a looped prolate center path generated by a tracing point on the tooth centers of the annulus with respect to the rotor upon rotation of the annulus and rotor in accordance with the speed reduction ratio, an output member rotatably mounted concentrically with the axis of the control shaft and connected to the driven shaft for rotating the same, and coupling means beween the rotor and the output member for rotating the output member as the rotor is rotated, said resilient means forming a strain release and absorbing shocks transmitted from the steering means through the operating shaft.

4. A steering gear mechanism for the steering means of vehicles or the like comprising, a manipulatable rotatable control shaft, a rotatable driven shaft operating the steering means pursuant to manipulations of the control shaft, an internal toothed annulus member concentric with the axis of the control shaft, an eccentric carried by the control shaft, an external toothed rotor member meshing with the internal toothed annulus member and rotatably mounted on the eccentric for oscillation with respect to the annulus, resilient means normally securing one of said members against rotation but resiliently permitting limited rotation thereof, the other of said members being rotated at a reduced speed with respect to the control shaft in accordance with the relative numbers of teeth on the annulus member and the rotor member, the teeth of the rotor member being based on a looped prolate center path generated by a tracing point on the tooth centers of the annulus member with respect to the rotor member upon rotation of the annulus member and rotor member in accordance with the speed reduction ratio, an output member rotatably mounted concentrically with the axis of the control shaft and connected to the driven shaft for rotating the same, and coupling means between the output member and the rotatable one of the annulus and rotor members for rotating the former as the latter is rotated, said resilient means forming a strain release and absorbing shocks transmitted from the steering means through the operating shaft.

5. A steering gear mechanism for the steering means of vehicles or the like comprising, a housing, a rotatable output member in the housing and having a sleeve extension extending through one side of the housing for operating the steering means, a bearing in said one side of the housing for rotatably mounting the sleeve extension and the output member, a manipulatable rotatable control shaft extending through the other side of the housing and through the output member and its sleeve extension, a bearing in said other side of the housing for rotatably mounting the control shaft, inboard and outboard bearings adjacent said one side of the housing between the control shaft and the sleeve extension of the output member for rotatably mounting the same with respect to each other, a stationary internal toothed annulus within the housing concentric with the axis of the control shaft, an eccentric carried by the control shaft within the housing, an external toothed rotor meshing with the internal toothed annulus and rotatably mounted on the eccentric for oscillation with respect to the annulus and for rotation at a reduced speed with respect to the control shaft in accordance with the relative numbers of teeth on the annulus and rotor, the teeth of the rotor being based on a looped prolate center path generated by a tracing point on the tooth centers of the annulus with respect to the rotor upon rotation of the annulus and rotor in accordance with the speed reduction ratio, and coupling means between the rotor and the output member for rotating the output member as the rotor is rotated.

6. A steering gear mechanism for the steering means of vehicles or the like comprising, a housing, a rotatable output member in the housing and having a sleeve extension extending through one side of the housing for operating the steering means, a bearing in said one side of the housing for rotatably mounting the sleeve extension and the output member, a manipulatable rotatable control shaft extending through the other side of the housing and through the output member and its sleeve extension, a bearing in said other side of the housing for rotatably mounting the control shaft, inboard and outboard bearings adjacent said one side of the housing between the control shaft and the sleeve extension of the output member for rotatably mounting the same with respect to each other, an internal toothed annulus member within the housing concentric with the axis of the control shaft, an eccentric carried by the control shaft within the housing, an external toothed rotor member meshing with the internal toothed annulus member and rotatably mounted on the eccentric for oscillation with respect to the annulus member, means for securing one of said meshing toothed members against rotation, the other of said meshing toothed members being rotated at a reduced speed with respect to the control shaft in accordance with the relative numbers of teeth on the annulus member and the rotor member, the teeth of the rotor member being based on a looped prolate center path generated by a tracing point on the tooth centers of the annulus member with respect to the rotor member upon rotation of the annulus member and rotor member in accordance with the speed reduction ratio, and coupling means between the output member and the rotatable meshing toothed members for rotating the former as the latter is rotated.

References Cited in the file of this patent

UNITED STATES PATENTS

| | | |
|---|---|---|
| 305,741 | Clemons | Sept. 30, 1884 |
| 1,449,351 | Seeck | Mar. 20, 1923 |
| 1,572,519 | Davis | Feb. 9, 1926 |
| 1,633,209 | Henninger | June 21, 1927 |
| 1,641,766 | Laukhuff | Sept. 6, 1927 |
| 1,694,031 | Braren | Dec. 4, 1928 |
| 2,170,951 | Perry | Aug. 29, 1939 |
| 2,247,839 | Halbord et al. | July 1, 1941 |
| 2,475,504 | Jackson | July 5, 1949 |
| 2,666,336 | Hill et al. | Jan. 19, 1954 |
| 2,838,952 | Seeliger | June 17, 1958 |
| 2,844,052 | Stoeckicht | July 22, 1958 |

FOREIGN PATENTS

| | | |
|---|---|---|
| 459,025 | Germany | Apr. 25, 1928 |

OTHER REFERENCES

"Kinematics of Gerotors, Rotoids and Gears," by Myron F. Hill, 1947. (Copy in Div. 9.)